May 14, 1929.  J. W. WOODLING ET AL  1,713,360

TIRE CHAIN APPLYING DEVICE

Filed April 25, 1928

Inventors
John W. Woodling
James W. McFayden
By Nathaniel Frucht
their Attorney

Patented May 14, 1929.

1,713,360

UNITED STATES PATENT OFFICE.

JOHN W. WOODLING AND JAMES W. McFAYDEN, OF ALBION, PENNSYLVANIA.

TIRE-CHAIN-APPLYING DEVICE.

Application filed April 25, 1928. Serial No. 272,750.

The present invention concerns devices for quickly and easily applying a tire chain to a tire of an automobile when the tire is in deep snow or mud.

A specifically important feature of the invention is the positive holding of the chain in place on the tire, while permitting both rapid securing and releasing. Other features of great value are the adjustability of the device to fit tires of different sizes, and the ready application of the device to either spoked or disk wheels, as desired.

The above and other features of my invention will be more fully understood from the following description in connection with the accompanying drawings, in which Fig. 1 is a side view of an automobile wheel and of the device embodying the invention, in operative position;

Figure 1:
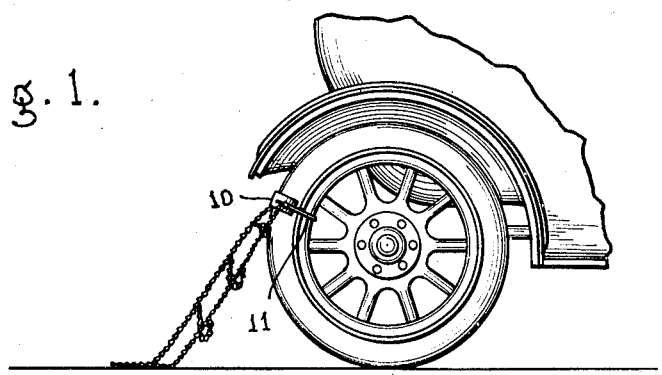

The invention comprises an elastic upper member 10 and an adjustable strap member 11, the elastic member 10 being formed of two spring pieces 12 adjustably joined by a connecting plate 13 by means of rivets 14 or other similar fastening means. The plate 13 may be of different sizes, or may have a plurality of rivet holes 15 which cooperate with corresponding rivet holes 16 on each spring piece 12, the holes being spaced so as to vary the size of the elastic upper member 10.

Each spring piece has a hook 17 rigidly secured thereto, facing towards the top thereof, and is formed with a slot 18 for receiving the strap member 11, ends 19 being turned outwardly to prevent cutting of the tire.

The strap member 11 has a hook loop 20 at one end, holding a hook 21, a ring 22 at the other end, and an adjustable buckle 23 holding a second hook 24.

Figure 2:
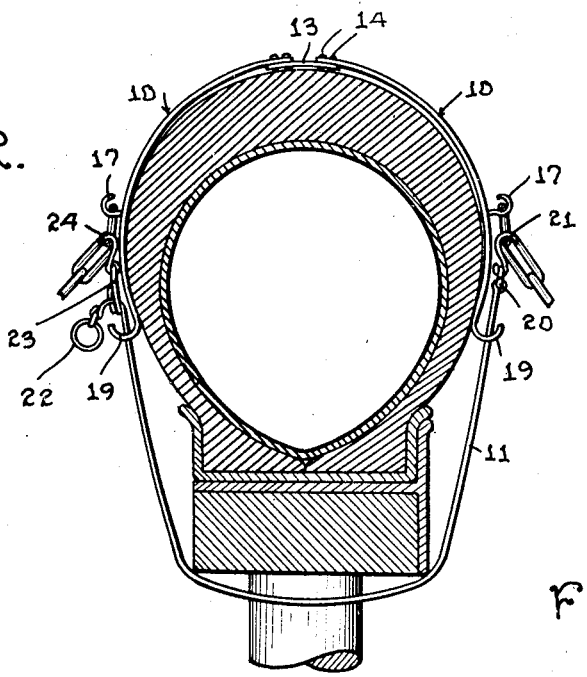
Fig. 2 is an enlarged view of the device in position on the wheel, the tire and rim being shown in section.
Figures 3, 4:
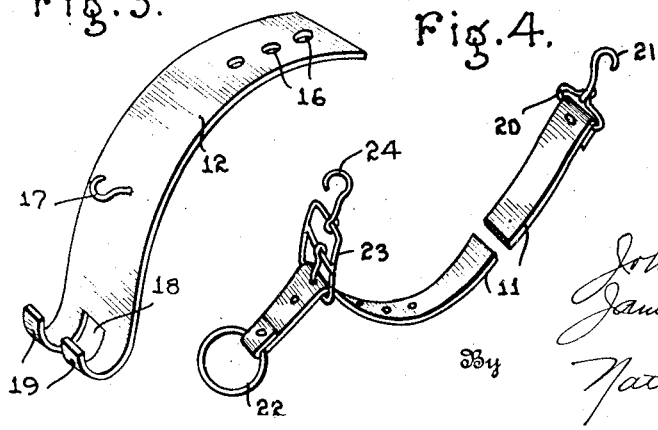
Figs. 3, 4 and 5 are detailed perspective views of the elements forming the complete device.
Figure 5:
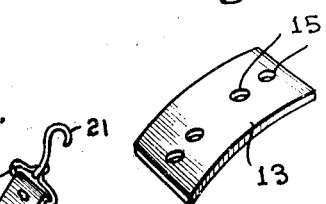

In operation, the elastic member 10 is snapped over the top of the tire, and corresponding links of the chain ends are placed on the hooks 17. The strap 11 is then passed through the wheel below the rim, hook 21 being hooked to the chain link at one end, and hook 24 of the buckle 23 being hooked to the corresponding chain link at the other end, as shown in Fig. 2. The strap 11 is then pulled tight and the buckle 23 secured in position in the well-known manner.

The wheel is then revolved, or the vehicle moves forward, thus evenly and expeditiously applying the chain. When one complete revolution has been made, the rotation of the wheel is stopped, the two ends of the chain are fastened together, and the device disengaged from the wheel. The hooks 17, 21 and 24 hold the chain links positively and securely while the use of the adjustable strap 11 permits quick attachment and detachment.

By employing this device, the chains may thus be applied without jacking up the wheel. When using the device with disk wheels, only the elastic upper portion need be used, as the resilience of the spring parts 12 will hold the member 10 in place.

If, on the other hand, the upper elastic member 10 is not available for any reason, a satisfactory applying of the chain may be obtained by the use of the strap 11 alone, using one of the cross links of the chain as the upper member.

The invention therefore provides a simple, effective chain applier, adjustable to fit any size tire, and applicable to both spoke and disk wheels.

We claim:

1. A tire chain attaching device comprising an elastic member adapted to engage the tire of an automobile wheel, a strap member adapted to pass underneath the rim thereof, and corresponding chain holding means on said members for engaging links of a tire chain therebetween to positively lock said tire chain on the wheel.

2. A tire chain attaching device comprising an elastic member adapted to engage the tire of an automobile wheel, a strap member adapted to pass underneath the rim thereof, and corresponding chain holding means on said members for engaging links of a tire chain therebetween to positively lock said tire chain on the wheel, said elastic member being adjustable to accommodate different sized tires.

3. A tire chain attaching device comprising an elastic member adapted to engage the tire of an automobile wheel, a strap member adapted to pass underneath the rim thereof and open hooks on said elastic member and said strap member for engaging links of a tire chain therebetween to positively lock said tire chain on the wheel.

In testimony whereof we affix our signatures.

JOHN W. WOODLING.
JAMES W. McFAYDEN.